Figure 1:
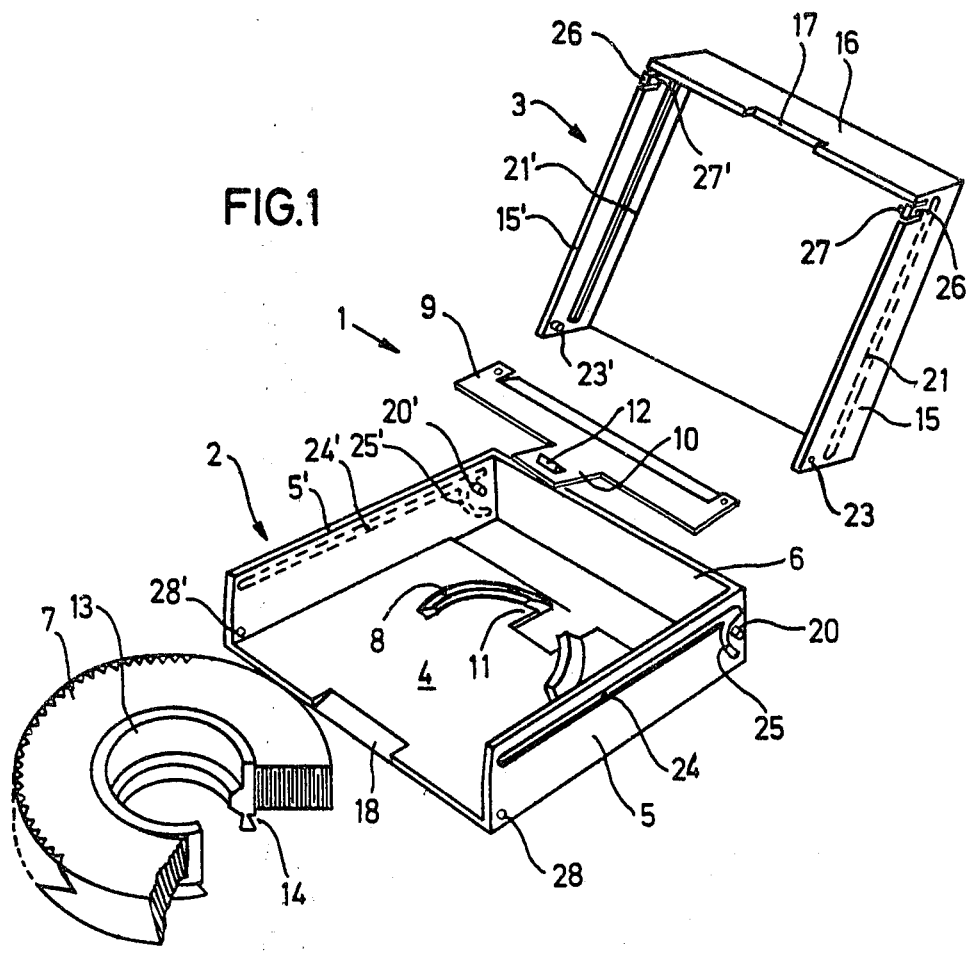

United States Patent [19]

Gliniorz et al.

[11] 4,420,079
[45] Dec. 13, 1983

[54] CONTAINER FOR TAPE-LIKE MATERIAL

[75] Inventors: Lothar Gliniorz, Frankenthal; Peter Dobler, Ludwigshafen; Klaus Schoettle, Heidelberg; Joachim Flohr, Viernheim; Rolf Maerthesheimer, Worms, all of Fed. Rep. of Germany

[73] Assignee: BASF Aktiengesellschaft, Ludwigshafen, Fed. Rep. of Germany

[21] Appl. No.: 236,501

[22] Filed: Feb. 20, 1981

[30] Foreign Application Priority Data

Feb. 23, 1980 [DE] Fed. Rep. of Germany ....... 3006864

[51] Int. Cl.³ .................. B65D 85/67; B65D 43/20; B65D 5/64; G11B 23/02
[52] U.S. Cl. .................. 206/387; 206/45.23; 220/331; 360/132; 242/197
[58] Field of Search ............ 206/387, 53, 389, 408, 206/403, 315, 45.23; 220/331; 360/132; 242/197

[56] References Cited

U.S. PATENT DOCUMENTS

| 391,145 | 10/1888 | Hardin | 220/331 |
|---|---|---|---|
| 2,329,685 | 9/1943 | Baker | 206/45.23 |
| 3,051,537 | 8/1962 | Diehl et al. | 312/20 |
| 3,140,777 | 7/1964 | Gordan | 206/315 |
| 3,272,325 | 9/1966 | Schoenmakers | 206/387 |
| 3,532,211 | 10/1970 | Gellert | 206/387 |
| 3,627,398 | 12/1971 | Reese | 312/246 |
| 3,904,150 | 9/1975 | Pinot | 242/199 |
| 4,347,537 | 8/1982 | Schoettle et al. | 360/132 |

FOREIGN PATENT DOCUMENTS

| 2145718 | 3/1972 | Fed. Rep. of Germany . |
| 2521371 | 5/1975 | Fed. Rep. of Germany . |
| 2817920 | 10/1979 | Fed. Rep. of Germany . |
| 2912423 | of 0000 | Fed. Rep. of Germany . |
| 2420818 | 10/1979 | France . |
| 1224737 | 3/1971 | United Kingdom . |

Primary Examiner—William T. Dixson, Jr.
Attorney, Agent, or Firm—Keil & Witherspoon

[57] ABSTRACT

A container for tape-like material wound into a roll or stored in a cartridge, which container consists of a bottom and a top part, which are pivotable relative to one another for the purpose of opening and closing the container and can, when the container is open, be telescoped with the aid of guides on the container, one of the parts possessing means for accommodating the roll or cartridge.

7 Claims, 3 Drawing Figures

CONTAINER FOR TAPE-LIKE MATERIAL

The present invention relates to a container for tape-like material, in particular magnetic tape, wound into a roll or stored in a cartridge, which container consists of a bottom and a top part and has side, front and rear walls, one of the parts possessing means for accommodating the roll or cartridge, and both parts being movably joined to one another by connecting means to enable them to assume an open position and a closed position.

German Laid-Open Application DOS No. 2,912,423 proposes a magnetic tape cartridge in which the bottom part and lid are joined together by hinges. To reduce the space occupied by the cartridge in the open state, further hinge means are provided, so that the lid can be folded backwards about the rear wall, so that it comes to rest against the outer surface of the base, and fastened to the latter by means of adhesive coatings or snap-fit connections. When the cartridge has been opened in this way, the tape reel is accessible for operation on a tape transport apparatus.

The hinge connecting means as well as the adhesive coatings and snap-fit connections between the cartridge parts present manufacturing difficulties, as does the handling of the cartridge.

U.S. Pat. No. 4,046,255 describes a container for accommodating a magnetic tape cartridge, comprising a housing and a slide which can be telescoped. The space occupied by such a container, when open, is almost twice as great as when it is closed, so that the container is not very suitable for use on small and compact recording/playback equipment.

It is an object of the present invention to provide a container for tape-like material, especially magnetic tape, wound into a roll or stored in a cartridge, which is simple to manufacture and to handle and occupies very little space.

We have found that this object is achieved, according to the invention, if guides for sliding one of the container parts into the other are provided on the container and if the container parts can, with the aid of connecting means, be brought into a position where they can be telescoped, telescoping of the container parts giving access to the roll or cartridge for operation on a drive mechanism.

In a preferred embodiment of the novel container, the connecting means consist of lateral pivots on one container part and guides on the other part, which cooperate with the pivots and run parallel to the base or top, and in which the pivots can rotate and slide.

In a further embodiment of the invention, the guides are in the form of grooves in the side walls, the grooves being parallel to the base or top and having a width matching the diameter of the pivots.

To improve guidance of the two container parts when they are being telescoped, a further embodiment of the container has a second set of guides, which run parallel to the first set, on one of the two parts, and guide pins for the second set on the other part, the second set of guides extending around the pivot points of the two container parts.

The novel container is not only easy to manufacture but also handy and simple to use. Furthermore, it occupies little space.

Figure 2:
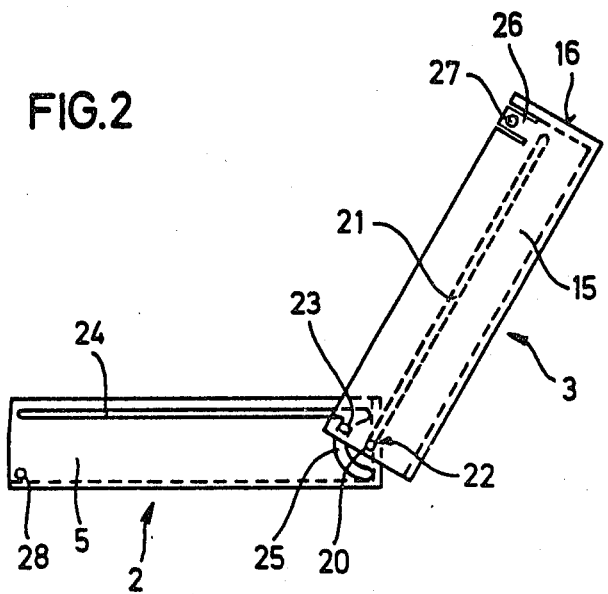
Figure 3:
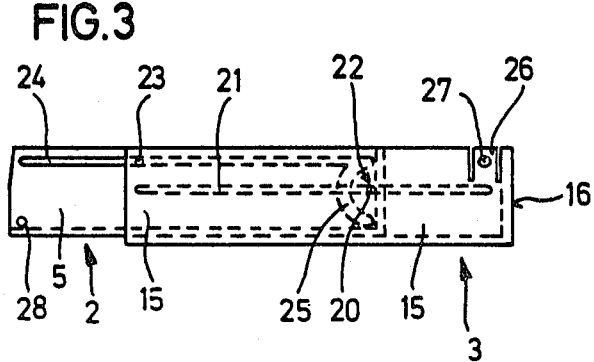

Further details and advantages of the invention are described below with reference to an embodiment illustrated in the accompanying drawing, in which FIG. 1 is an exploded perspective view of a container for a roll of tape-like material, FIG. 2 is a side view of the container of FIG. 1, with the lid in a tilted position, and FIG. 3 is a side view of the container of FIG. 1, with the bottom part and lid partly telescoped.

The container 1 consists of a bottom part 2 and a lid 3 (FIG. 1). Two side walls 5, 5' and a rear wall 6 are molded integrally with, or fastened to, the base 4 of the bottom part 2. The base 4 further possesses means for holding and locking a roll 7 of tape-like material, for example a magnetic tape. In the present embodiment, these means consist of a semi-circular web 8 which is open toward the open side of the bottom part and has an undercut at a slight distance above the base, and of a leaf spring 9 fixed to the base between the rear wall and the web. A tongue 10 passes through a cutaway 11 in the web so that it projects beyond the undercut, the tongue having a small incision, and the small tab 12 thereby formed being bent upwards so as to point toward the rear wall 6. The semi-circular web 8 may be molded integrally with, or machined out of, the base 4. Of course it is also possible to produce the web separately and to glue or weld it to the base.

The hub 13, provided with an annular groove 14 which matches the undercut, can be pushed into the semi-circular web, so that the groove and undercut rim engage, and is thus held on the bottom part 2, the hub furthermore being locked in position by means of the tab 12 on the leaf spring 9, which clicks into place behind the annular groove.

It is self-evident that the container is not restricted to specific means for holding and locking the roll. For example, rotational bearings for the hub can be provided. If the container is of an appropriate size, it is also possible to provide two hubs, rotatable on the base, between which the tape can be wound to and fro, for example in the form of a magnetic tape cartridge resembling a conventional compact cassette.

In the present embodiment, the lid 3 also possesses two side walls 15, 15' and a front wall 16. The arrangement of these walls is such that, when the container is closed, the lid 3 fits over the bottom part 2, giving a receptacle which is closed on all sides. To facilitate opening of the container by hand, a small recess 17 is provided in the front wall, and an inclined surface 18 is provided on the base 4, opposite the recess 17.

As is shown in FIGS. 2 and 3, the bottom part 2 and lid 3 are connected, via pivots 20, 20' on one part and guides on the other, so that the parts can rotate relative to one another and telescope.

The pivots 20, 20' are located near the rear ends of the two side walls 5, 5' of the bottom part 2, whilst the guides are grooves 21, 21' which run parallel to the base 4 and are located about half-way up each side wall 15, 15' of the lid 3. The pivots can both rotate and slide in the two grooves. To improve guidance of the two container parts 2 and 3 relative to one another, it is advantageous to locate the two grooves at a height above the inner surface of the lid 3 which corresponds to the distance of the pivots from the lower surface of the bottom part 2.

As a result of the two pivots 20, 20' being located at a distance from the rear ends of the side walls 5, 5', the bottom part 2 and lid 3 assume a stable position, relative to one another, during telescoping of the container parts, and when telescoping has been completed.

A further improvement in this regard can be achieved by providing a second set of guides on one of the container parts and corresponding guide pins 23, 23' on the other part. It is necessary to ensure that these guides extend around the pivot points 22 of the pivots 20, 20' to enable the guide pins to travel freely when the two container parts 2 and 3 execute a pivoting movement.

In the present embodiment, the second set of guides is also in the form of grooves, 24, 24', in the side walls 5, 5' of the bottom part 2. The grooves run parallel to, and at a distance from, the first set of grooves 21, 21'. The two guide pins 23, 23' are arranged on the inner surface of the side walls 15, 15' of the lid 3, at a height matching that of the grooves 24, 24', which grooves terminate in grooves 25, 25' running in an arc around the pivot points 22. The radius of the arc corresponds to the distance of the guide pins from the pivot points 22 of the pivots 20, 20'.

The container design can be simplified by providing both the grooves 21, 21' for the pivots 20, 20' and the grooves 24, 24' for the guide pins 23, 23' in one and the same pair of side walls of one part of the container, so that the pair of side walls of the other part can be dispensed with. In this case, appropriate supports for the pivots and guide pins must be provided on the said other part.

The bottom part 2 and lid 3 are fixed relative to one another, both in the closed state of the container and in the telescoped state, by a releasable catch mechanism. This consists of tongues 26, 26' which are formed by incisions in the two side walls 15, 15' of the lid 3, near the front ends of the said walls, domed projections 27, 27' being molded onto the inner surfaces of the tongues. The mechanism further comprises recesses or holes 28, 28', which are provided on the outer surface of, or in, the side walls of the bottom part 2, near the front ends of said side walls, immediately above the base; similar recesses or holes are suitably located at the rear ends of the side walls 5, 5'. The projections on the two tongues can engage these recesses or holes when the container is closed or the container parts are telescoped. The arc-shaped grooves 25, 25' can also be used in place of the recesses or holes at the rear ends of the side walls.

For use as a box for a tape cartridge, the container described above merely needs to be of a size matching the cartridge to be stored therein. In this case, the means 8 and 9 for holding and locking the tape roll are of course omitted. They can be replaced by, for example, lugs on the base of the container which engage the holes in the hubs carrying the tape rolls contained in the cartridge.

We claim:

1. A container for web-like material, especially magnetic tape wound onto one or two rolls or stored in a cartridge, for operation on a drive mechanism, said container being designed to assume an open or closed condition such that said container, when in its open condition is open for access to said rolls or cartridge by said mechanism both at its front and at its top, and when in its closed condition, is closed all around for protection of the tape or cartridge, said container having bottom and top parts and means pivotably connecting said bottom and top parts together, said bottom part having bottom, side and rear walls and means for accommodating the roll(s) or cartridge, and said top part having at least a top wall with a front wall attached thereto, and said connecting means having means, including pivots and a set of longitudinal guides on said two parts, respectively, for telescoping, in said open position said top part underneath said bottom part, thereby safeguarding said access at a minimum of space, wherein the pivots are rotatable and slidable relatively to the guides and, said guides, with said container in telescoped condition, running parallel to said bottom and top walls, wherein said telecoping means include means for insuring parallelity between said two parts during the telescoping movement, and wherein a second set of guides which run parallel to the first-mentioned set is provided on one of the two container parts, and guide pins for the second set are provided on the other part, arcuate sections of the second set of guides extending around the pivots, the radius of the arc corresponding to the distance between the pivots and the guide pins.

2. A container as claimed in claim 1, wherein the pivots are arranged in spatial relationship to the rear wall.

3. A container as claimed in claim 1, further provided with a holding and locking means for engaging said roll, rolls or cartridge.

4. A container as claimed in claim 3, wherein said holding and locking means consists of at least one web mounted on the inside of said bottom wall.

5. A container as claimed in claim 3 or 4, wherein said holding and locking means consists of a semi-circular web provided on the inside of said bottom wall.

6. A container as claimed in claim 3, wherein rotational bearings for the hub are provided in said holding and locking means.

7. A container as claimed in claim 3, wherein two rolls of tape wound on two hubs are provided and means on the inside of the bottom and/or top walls are provided for rotationally mounting each of said two hubs, so that between said two rolls the tape can be wound to and fro as it is the case in a magnetic tape cassette.

* * * * *